US012608013B2

(12) United States Patent
Chen et al.

(10) Patent No.: US 12,608,013 B2
(45) Date of Patent: Apr. 21, 2026

(54) COMMUNICATION DELAY COMPENSATION METHOD AND SYSTEM BASED ON AUTONOMOUS ROBOT

(71) Applicant: Hunan University of Science and Technology, Hunan (CN)

(72) Inventors: Chaoyang Chen, Hunan (CN); Zongyao Li, Hunan (CN); Pei Li, Hunan (CN); Juan Chen, Hunan (CN); Zuguo Chen, Hunan (CN); Ying Zou, Hunan (CN); Ming Lu, Hunan (CN); Zunhui Yi, Hunan (CN); Lei He, Hunan (CN); Liang Chen, Hunan (CN)

(73) Assignee: HUNAN UNIVERSITY OF SCIENCE AND TECHNOLOGY, Hunan (CN)

( * ) Notice: Subject to any disclaimer, the term of this patent is extended or adjusted under 35 U.S.C. 154(b) by 160 days.

(21) Appl. No.: 18/599,605

(22) Filed: Mar. 8, 2024

(65) Prior Publication Data

US 2025/0044803 A1     Feb. 6, 2025

(30) Foreign Application Priority Data

Aug. 4, 2023    (CN) .......................... 202310975105.8

(51) Int. Cl.
*G05D 1/24* (2024.01)
*B63G 8/00* (2006.01)
(Continued)

(52) U.S. Cl.
CPC .............. *G05D 1/24* (2024.01); *B63G 8/001* (2013.01); *B63G 8/39* (2013.01); *G01S 15/58* (2013.01);
(Continued)

(58) Field of Classification Search
CPC .. G05D 1/24; G05D 2109/38; G05D 2111/20; B63G 8/001; B63G 8/39;
(Continued)

(56) References Cited

U.S. PATENT DOCUMENTS

2009/0102707 A1* 4/2009 Elwell, Jr. ............... G01S 19/22
                                                                      342/357.52
2011/0141853 A1* 6/2011 Megdal ..................... G01S 5/30
                                                                      367/117

FOREIGN PATENT DOCUMENTS

CN        102636771 A  *  8/2012

OTHER PUBLICATIONS

Welch et al., An Introduction to the Kalman Filter, Jul. 24, 2006, Department of Computer Science, University of North Carolina at Chapel Hill, pp. 1-16 (Year: 2006).*

* cited by examiner

*Primary Examiner* — Dale W Hilgendorf
*Assistant Examiner* — Frank T Glenn, III
(74) *Attorney, Agent, or Firm* — MH2 Technology Law Group, LLP

(57) ABSTRACT

The disclosure provides a communication delay compensation method and a communication delay compensation system based on an autonomous robot, where the method includes the following steps: establishing a state equation based on a system model of an the AUV positioning system; acquiring an included angle between a direction vector of the AUV to an observation station and a velocity vector of the AUV based on the system model; establishing an observation equation according to the state equation and the included angle; establishing an extended Kalman filter equation based on the system model, the included angle and the observation equation; and calculating a position information
(Continued)

predicted value at the current time by using the extended Kalman filter equation to complete communication delay compensation.

5 Claims, 5 Drawing Sheets

(51) Int. Cl.
*B63G 8/39* (2006.01)
*G01S 15/58* (2006.01)
*G05D 109/30* (2024.01)
*G05D 111/20* (2024.01)

(52) U.S. Cl.
CPC ... *B63G 2008/004* (2013.01); *G05D 2109/38* (2024.01); *G05D 2111/20* (2024.01)

(58) Field of Classification Search
CPC .............. B63G 2008/004; G01S 15/58; H04L 43/0852; H04L 41/145; H04W 4/025; H04W 4/029
See application file for complete search history.

COMMUNICATION DELAY COMPENSATION METHOD AND SYSTEM BASED ON AUTONOMOUS ROBOT

CROSS-REFERENCE TO RELATED APPLICATIONS

This application claims priority to Chinese Patent Application No. 202310975105.8, filed on Aug. 4, 2023, the contents of which are hereby incorporated by reference.

TECHNICAL FIELD

The disclosure relates to a field of underwater communication compensation, and in particular to a communication delay compensation method and a communication delay compensation system based on an autonomous robot.

BACKGROUND

Autonomous Underwater Vehicle (AUV) is an advanced underwater vehicle integrating intelligent technology and other advanced computing technologies, and integrating many module functions such as automatic control, navigation and positioning, energy conversion, target identification and fault handling, and possesses many advantages such as strong autonomy, high concealment, wide environmental adaptability, low cost and easy expansion.

In underwater navigation tasks, accurate navigational information is required for applications listed above, and the location information is not only used to determine the spatial location, but also an important guarantee for the effective application and safe recovery of the AUV as a whole. Because the propagation loss of acoustic signals is much lower than that of radio signals, the acoustic navigation method is the most effective method, which makes underwater acoustic positioning system an indispensable positioning and navigation component of the AUV, and also a key to the smooth implementation of the underwater navigation tasks.

In the actual underwater navigation environment, it takes time for the communication, data processing and underwater data transmission between the AUV and other node base stations, and a data delay occurs when the measurement information enters the filter estimation, affecting the final filtering effect.

Kalman filter algorithm is mainly used for sensor redundant data fusion in dynamic environment. Based on the statistical characteristics of the measurement model, this disclosure recursively determines the optimal estimation of the fused data in the statistical sense, which makes Kalman filter algorithm very suitable for systems without large data transmission and storage capabilities.

SUMMARY

In order to solve technical problems in the background, a communication delay compensation method based on an autonomous underwater robot by constructing measurement information of extended Kalman filter is provided by the disclosure. In the method, Doppler measurement information is substituted into a measurement equation to perform measurement update through direction angle information formed by a Doppler-measured direction vector at the last time and the current time of Autonomous Underwater Vehicle (AUV) and a Doppler-measured direction vector at the last time of the AUV and the observation station. By adopting the communication delay compensation algorithm of the underwater positioning system, the positioning error caused by underwater communication delay may be effectively reduced, the positioning accuracy is improved, the performance is better than that of the conventional extended Kalman filtering method, and the practical effect is good.

In order to achieve above objectives, a communication delay compensation method based on an autonomous robot is provided by the disclosure, and includes following steps:

establishing a state equation based on a system model of an AUV positioning system;

acquiring an included angle between a direction vector of the AUV to an observation station and a velocity vector of the AUV based on the system model;

establishing an observation equation according to the state equation and the included angle;

establishing an extended Kalman filter equation based on the system model, the included angle and the observation equation; and calculating a position information predicted value at the current time by using the extended Kalman filter equation to complete communication delay compensation.

Optionally, the state equation includes:

$$X_k = f(X_{k-1}, u_{k-1}) + \Gamma_{k-1} W_k;$$

in the formula, $X_k$ represents an n-dimensional state vector at k point of time; $X_{k-1}$ represents an n-dimensional state vector at k−1 point of time; $u_{k-1}$ represents a system input; $\Gamma_{k-1}$ represents a system noise input matrix from k−1 point of time to k point of time; $W_k$ represents a system noise vector at k−1 point of time; and $f$ represents a nonlinear state function of a system state.

Optionally, a method for acquiring the included angle includes following steps: establishing a Doppler measurement equation according to the system model, and acquiring the included angle through a backward deduction of the Doppler measurement equation;

$$\begin{cases} \hat{f}_k = f_k + e_k \\ f_k = f_s\left(1 + \dfrac{v_k^T(u - s_k)}{c|u - s_k|}\right) = f_s\left(1 + \dfrac{|v_k|}{c}\cos\beta_k\right) \end{cases},$$

where $f_s$ represents a frequency of an acoustic signal emitted by a target; $f_k$ represents a frequency of an acoustic signal theoretically received by the target; $\hat{f}_k$ represents a frequency of an acoustic signal actually received by the target; $e_k$ represents frequency noise; c represents a propagation speed of a propagation signal in water; $v_k$ represents a driving speed of the AUV; u represents a position of the observation station; $s_k$ represents a position of the AUV at k point of time; $\beta_k$ represents the included angle between the direction vector of the AUV to the observation station and the velocity vector of the AUV; and T represents a vector transposed symbol.

Optionally, the observation equation includes:

$$Z_k' = d_1'^2 + d_{\delta t}^2 - 2d_1'^2 d_{\delta t}^2 \cos\beta_k;$$

3 in the formula, d' represents a distance of the AUV from the observation station at a last point of time; $\delta_t$ represents a communication delay time; and $d_{\delta_t}$ represents a distance traveled by the AUV within $\delta_t$ duration.

Optionally, a method for calculating the position information predicted value includes:

according to distance information between the AUV and the observation station, calculating position information of the AUV, acquiring a position information measured value of the AUV at the current time, and at the same time, acquiring a position information predicted value of the AUV at the last time and a position information prediction error of the AUV at the last time;

calculating a position information observed value of the AUV at the current time by using the observation equation and according to the position information measured value of the AUV at the current time; and calculating the position information predicted value of the AUV at the current time by using the extended Kalman filter equation and according to the position information observed value of the AUV at the current time, the position information predicted value of the AUV at the last time and the position information prediction error of the AUV at the last time, where the position information predicted value of the AUV at the current time is the position information predicted value.

Optionally, calculating a next position information predicted value by using the extended Kalman filter equation according to the position information predicted value of the AUV at the last time, where the steps include:

$$\hat{X}_{k|k-1} = f(\hat{X}_{k-1}, u_{k-1});$$

in the formula, $\hat{X}_{k|k-1}$ represents the next position information predicted value; $\hat{X}_{k-1}$ is the position information predicted value of the AUV;

calculating a next position information prediction error by using the extended Kalman filter equation and according to the position information prediction error of the AUV at the last time, where the steps include:

$$P_{k|k-1} = \Phi_{k|k-1} P_{k-1} \Phi_{k|k-1}^T + \Gamma_{k-1} Q_{k-1} \Gamma_{k-1}^T,$$

where $P_{k|k-1}$ represents the next position information prediction error; $P_{k-1}$ represents the position information prediction error of the AUV at the last time; $Q_{k-1}$ represents a position observation error at the last time;

$$\Phi_{k|k-1}^T$$

represents a state transition matrix, T represents a vector transposed symbol, and $\Gamma_{k-1}$ represents a system noise input matrix;

calculating a filtering gain according to the next position information prediction error by using the extended Kalman filter equation, where the steps include:

$$K_k = P_{k|k-1} H_k^T (H_k P_{k|k-1} H_k^T + R_k)^{-1},$$

4 where $K_k$ represents the filtering gain; $P_{k|k-1}$ represents the next position information prediction error; $H_k$ represents an observation matrix at time k; and $R_k$ represents a system noise error;

calculating the position information predicted value at the current time by using the extended Kalman filter equation and according to the next position information predicted value, the filtering gain and the position information observed value at the current time, where the steps include:

$$\hat{X}_k = \hat{X}_{k|k-1} + K_k(Z_k - \hat{Z}_{k|k-1});$$

in the formula, $\hat{X}_k$ represents position information predicted value at the current time; $\hat{X}_{k|k-1}$ represents the next position information predicted value; $K_k$ represents the filtering gain, $Z_k$ represents a position observation predicted value at the current time; and $\hat{Z}_{k|k-1}$ represents the position information predicted value of the AUV at the last time;

calculating the position information prediction error at the current time by using the extended Kalman filter equation and according to the next position information prediction error, where the steps include:

$$P_k = (I - K_k H_k) P_{k|k-1};$$

in the formula, $P_k$ represents the position information prediction error at the current time; I represents unit matrix; $H_k$ represents the observation matrix at time k; and $P_{k|k-1}$ represents the next position information prediction error.

A communication delay compensation system based on an autonomous robot is also provided by the disclosure, and includes an AUV positioning system, also includes a first construction module, an acquisition module, a second construction module, a third construction module and a prediction module;

the first construction module is used for establishing a state equation based on a system model of the AUV positioning system;

the acquisition module is used for acquiring an included angle between a direction vector of the AUV to an observation station and a velocity vector of the AUV based on the system model;

the second construction module is used for establishing an observation equation according to the state equation and the included angle;

the third construction module is used for establishing an extended Kalman filter equation based on the system model, the included angle and the observation equation; and the prediction module is used for calculating a position information predicted value at the current time by using the extended Kalman filter equation to complete communication delay compensation.

Optionally, the state equation includes:

$$X_k = f(X_{k-1}, u_{k-1}) + \Gamma_{k-1} W_k;$$

in the formula, $X_k$ represents an n-dimensional state vector at k point of time; $X_{k-1}$ represents an n-dimensional state vector at k−1 point of time; $u_{k-1}$ represents a system input; $\Gamma_{k-1}$ represents a system noise input matrix from k−1 point of time to k point of time; $W_k$ represents a system noise vector at k−1 point of time; and $f$ represents a nonlinear state function of a system state.

Compared with the prior art, the disclosure has following beneficial effects.

According to the disclosure, the included angle between the velocity direction vector and the AUV and the position vector of the observation station is calculated by using the Doppler measurement information of the AUV, the observation equation of extended Kalman filter (EKF) is reconstructed, and EKF is used for optimal filter estimation. The disclosure may effectively compensate the positioning error caused by underwater communication delay, and has good practical effects.

BRIEF DESCRIPTION OF THE DRAWINGS

In order to explain the technical scheme of this disclosure more clearly, the drawings needed in the embodiments are briefly introduced below. Obviously, the drawings in the following description are only some embodiments of this disclosure. For ordinary technicians in this field, other drawings may be obtained according to these drawings without paying creative labor.

DETAILED DESCRIPTION OF THE EMBODIMENTS

In the following, the technical scheme in the embodiment of the disclosure will be clearly and completely described with reference to the drawings in the embodiment of the disclosure. Obviously, the described embodiment is only a part of the embodiment of the disclosure, but not the whole embodiment. Based on the embodiments in this disclosure, all other embodiments obtained by ordinary technicians in this field without creative work belong to the protection scope of this disclosure.

In order to make the above objects, features and advantages of this disclosure more obvious and easier to understand, the disclosure will be further described in detail with the attached drawings and specific embodiments.

Embodiment 1

Figure 1:
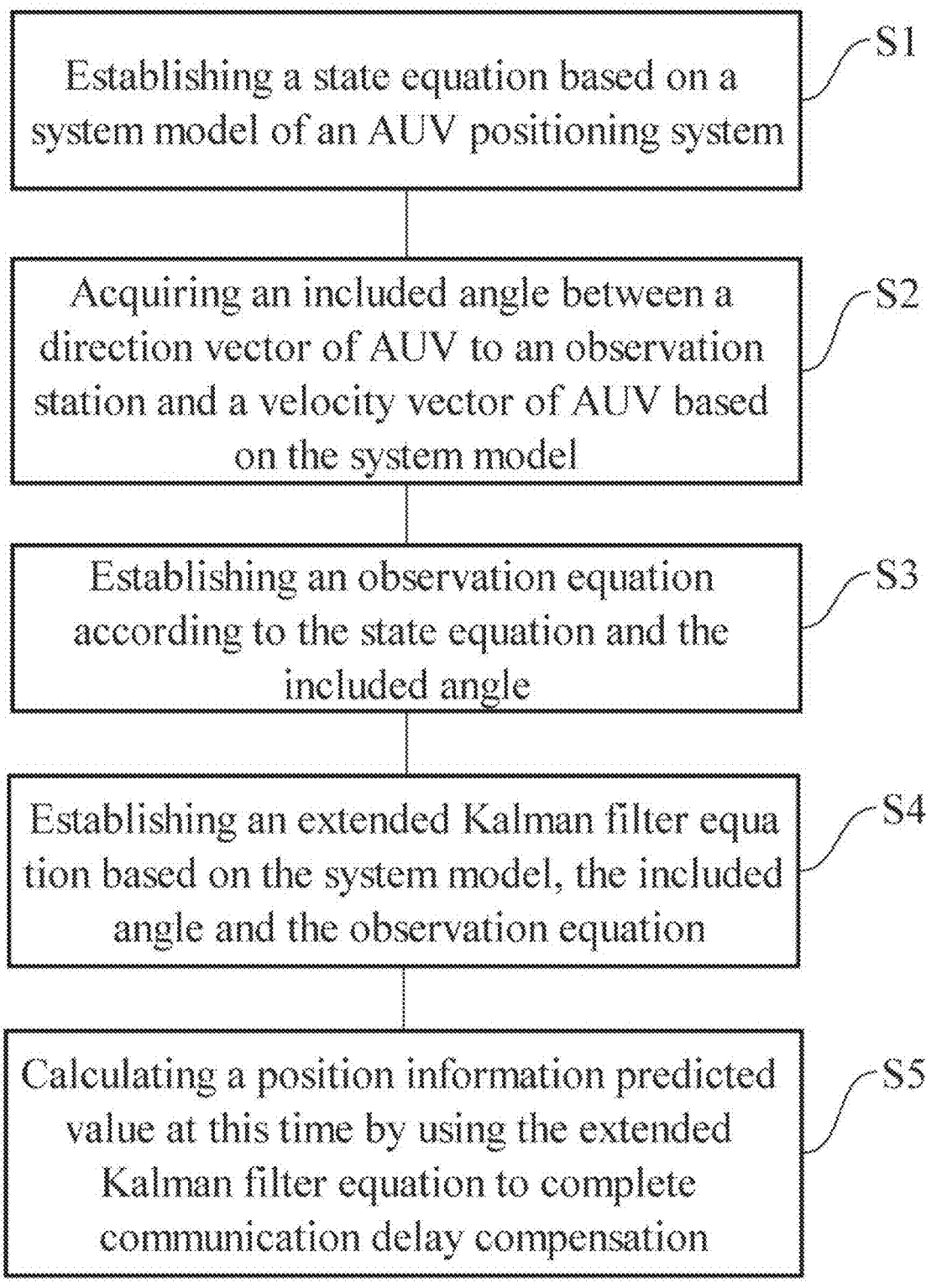
FIG. 1 is a flow chart of a method according to an embodiment of the present disclosure.

As shown in FIG. 1, FIG. 1 is a flow chart of a method according to an embodiment of the present disclosure, and steps of the method include:

S1, establishing a state equation based on a system model of Autonomous Underwater Vehicle (AUV) positioning system.

based on the system model of the AUV, establishing the state equation:

$$X_k = f(X_{k-1}, u_{k-1}) + \Gamma_{k-1} W_k,$$

in the formula, $X_k$ represents an n-dimensional state vector at k point of time; $X_{k-1}$ represents an n-dimensional state vector at k−1 point of time; $u_{k-1}$ represents a system input; $\Gamma_{k-1}$ represents a system noise input matrix from k−1 point of time to k point of time; $W_k$ represents a system noise vector at k−1 point of time; and $f$ represents a nonlinear state function of a system state.

Figure 2:
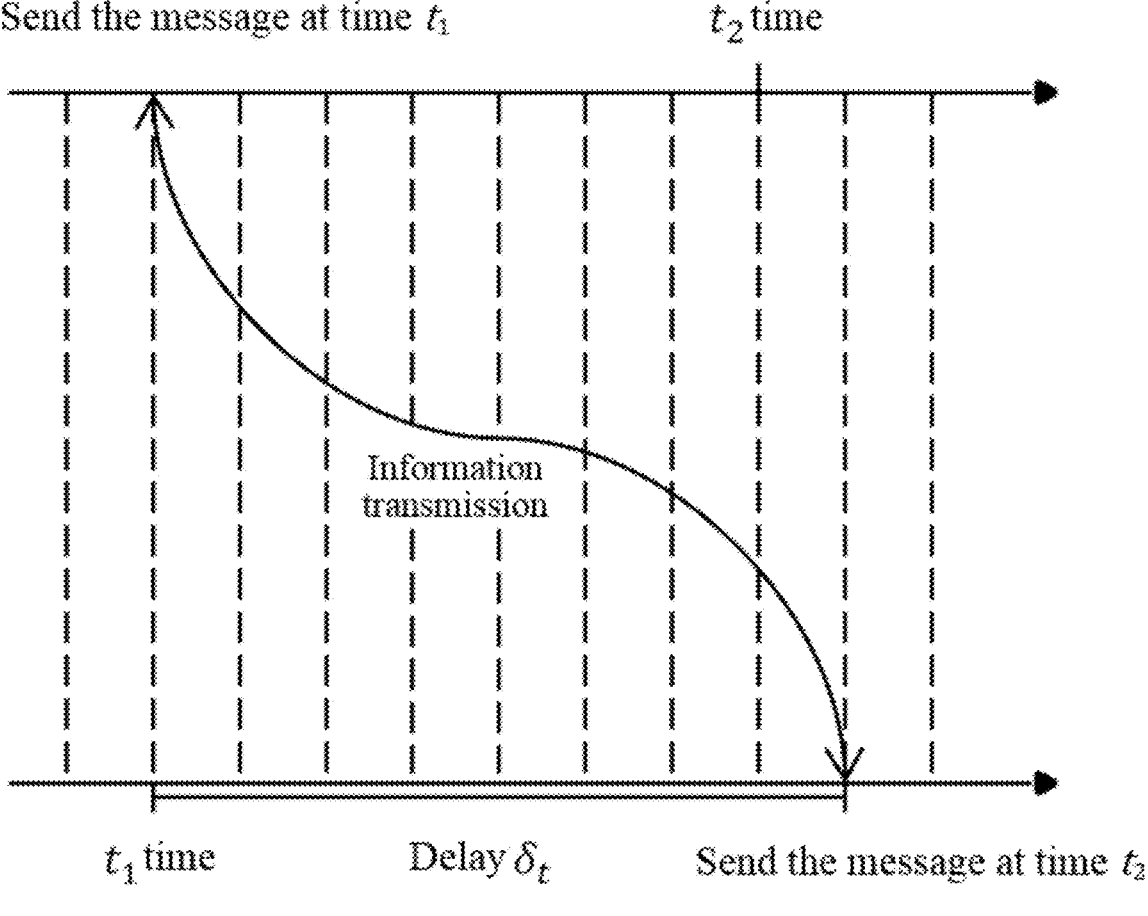
FIG. 2 is a schematic diagram of communication delay of a positioning system according to an embodiment of the present disclosure.

In this embodiment, considering that the communication delay in the underwater positioning system may affect the positioning accuracy, if the distance between the AUV and the observation station is directly substituted into the observation equation as measurement information, a large error is introduced to affect the navigation performance. In this scenario, this embodiment introduces Doppler measurement information and uses an EKF filtering method based on a reconstructed measurement equation to compensate the navigation error caused by the delay. The communication delay of the positioning system is shown in FIG. 2.

Figure 3:
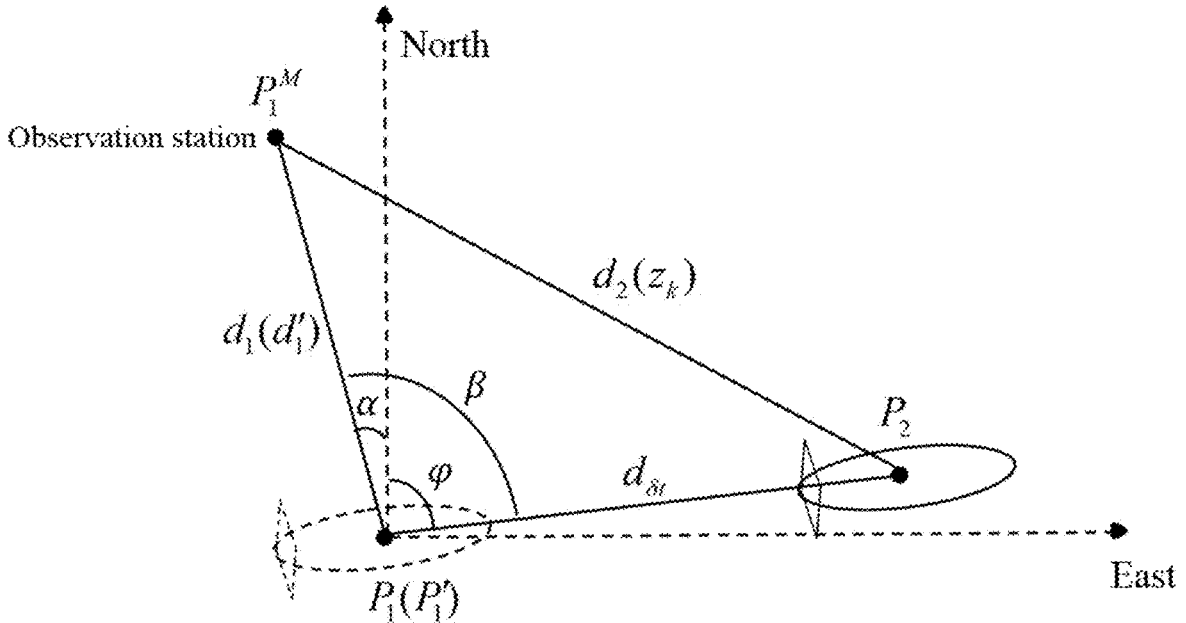
FIG. 3 is a motion diagram of Autonomous Underwater Vehicle (AUV) according to an embodiment of the present disclosure.
Figure 4:
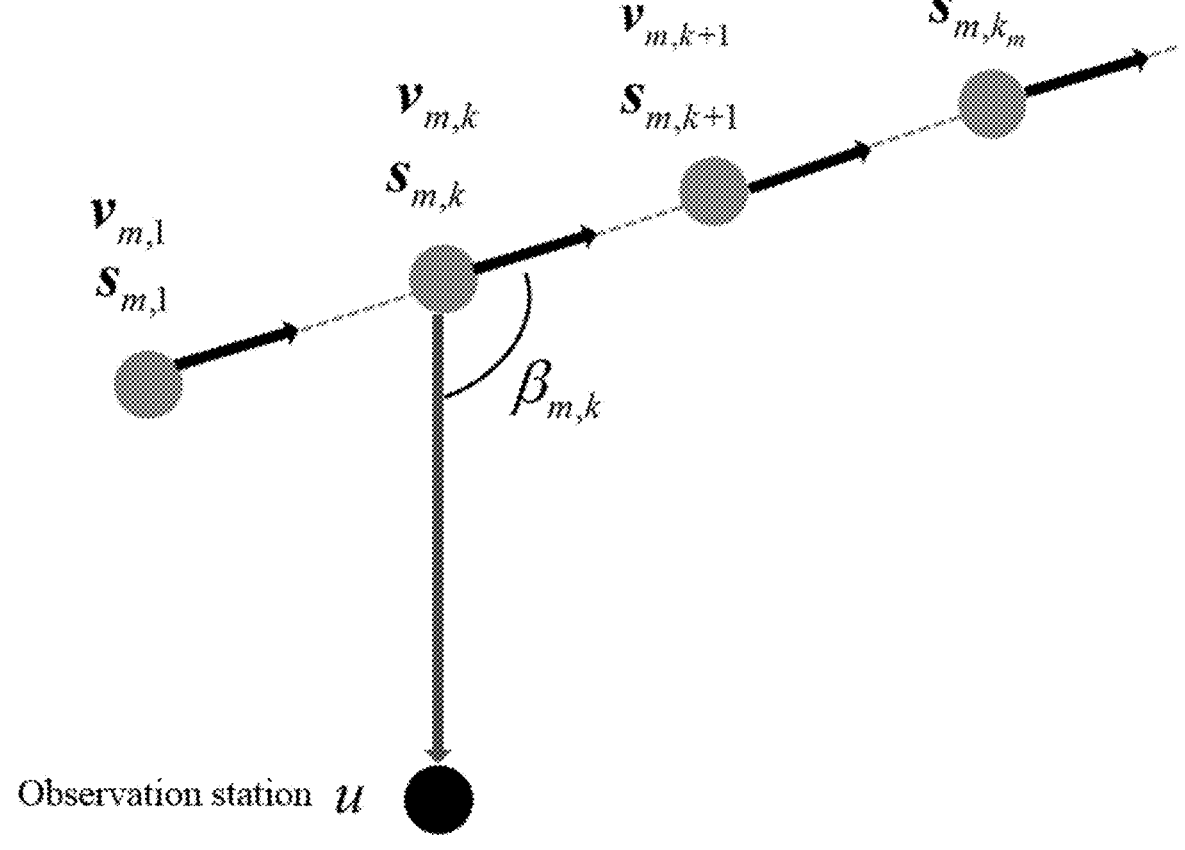
FIG. 4 is a geometric diagram of a positioning target based on Doppler measurement according to an embodiment of the present disclosure.

S2, acquiring an included angle between a direction vector of the AUV to an observation station and a velocity vector of the AUV based on the system model (the motion schematic of the AUV is shown in FIG. 3) is obtained, including the following steps:

as shown in FIG. 4, a Doppler measurement equation of the AUV is obtained based on a geometric diagram of the target positioning by the mobile sensor with Doppler measurement.

$$\begin{cases} \hat{f}_k = f_k + e_k \\ f_k = f_s\left(1 + \dfrac{v_k^T(u - s_k)}{c|u - s_k|}\right) = f_s\left(1 + \dfrac{|v_k|}{c}\cos\beta_k\right) \end{cases},$$

where $f_s$ represents a frequency of an acoustic signal emitted by a target; $f_k$ represents a frequency of an acoustic signal theoretically received by the target; $\hat{f}_k$ represents a frequency of an acoustic signal actually received by the target; $e_k$ represents frequency noise; c represents a propagation speed of a propagation signal in water; $v_k$ represents a driving speed of the AUV; u represents a position of the observation station; $s_k$ represents a position of the AUV at k point of time; $\beta_k$ represents the included angle between the direction vector of the AUV to the observation station and the velocity vector of the AUV; T represents a vector transposed symbol.

Then, based on the transceiver frequency, an included angle of the AUV is deduced from the Doppler measurement equation:

$$\beta_k = \arccos\left(\dfrac{c}{|v_k|}\left(\dfrac{f_k}{f_s} - 1\right)\right).$$

Finally, according to the included angle, the measurement equation of EKF is reconstructed, and an updated observation equation is:

$$Z_k' = d_1'^2 + d_{\delta t}^2 - 2d_1'^2 d_{\delta t}^2 \cos \beta_k,$$

where $$Z_k'$$

represents an Euclidean distance between the AUV and the observation station at time t2, d' represents a distance of the AUV from the observation station at a last point of time; $\delta_t$ represents a communication delay time; and $d_{\delta t}$ represents a distance traveled by the AUV within $\delta_t$ duration, and $\beta_k$ represents the included angle between the direction vector of the AUV to the observation station and the velocity vector of the AUV.

Thus, more accurate position information of the AUV at a signal receiving time t2 is obtained, and compensation for communication delay positioning error is realized.

S3, establishing an observation equation according to the state equation and the included angle:

$$Z_k' = d_1'^2 + d_{\delta t}^2 - 2d_1'^2 d_{\delta t}^2 \cos \beta_k;$$

in the formula, d' represents a distance of the AUV from the observation station at a last point of time; $\delta_t$ represents a communication delay time; and $d_{\delta t}$ represents a distance traveled by the AUV within $\delta_t$ duration.

Using the observation equation, calculating the distance observation value at the current time;

$$z_k = h(\hat{X}_{k|}) + \psi_k^p,$$

where $z_k$ represents an observation vector at time k, $h(\hat{X}_{k|})$ represents a nonlinear function of a system observation vector, and $$\psi_k^p$$

represents an observation noise vector at time k.

S4, establishing an extended Kalman filter equation based on the system model, the included angle and the observation equation. The observation equation is updated according to the Doppler measurement information.

S5, calculating a position information predicted value at the current time by using the extended Kalman filter equation to complete communication delay compensation.

According to distance information between the AUV and the observation station, calculating position information of the AUV, acquiring a position information measured value of the AUV at the current time, and at the same time, acquiring a position information predicted value of the AUV at the last time and a position information prediction error of the AUV at the last time;

calculating a position information observed value of the AUV at the current time by using the observation equation and according to the position information measured value of the AUV at the current time; and calculating the position information predicted value of the AUV at the current time by using the extended Kalman filter equation and according to the position information observed value of the AUV at the current time, the position information predicted value of the AUV at the last time and the position information prediction error of the AUV at the last time, where the position information predicted value of the AUV at the current time is the position information predicted value.

Calculating the position predicted value of the AUV at the current time by using the extended Kalman equation and according to the position information observed value of the AUV at the current time, the position information predicted value of the AUV at the last time and the position information prediction error of the AUV at the last time, where a complete extended Kalman filtering process is as follows:

a state prediction:

$$\hat{X}_{k|k-1} = f(\hat{X}_{k-1}, u_{k-1}),$$

where $\hat{X}_{k|k-1}$ represents the next position information predicted value; $\hat{X}_{k-1}$ is the position information predicted value of the AUV;

calculating a next position prediction by using the extended Kalman filter equation and according to the position information prediction error of the AUV at the last time. The established equation is:

$$P_{k|k-1} = \Phi_{k|k-1} P_{k-1} \Phi_{k|k-1}^T + \Gamma_{k-1} Q_{k-1} \Gamma_{k-1}^T,$$

where $P_{k|k-1}$ represents the next position information prediction error; $P_{k-1}$ represents the position information prediction error of the AUV at the last time; $Q_{k-1}$ represents a position observation error at the last time;

$$\Phi_{k|k-1}^T$$

represents a state transition matrix, T represents a vector transposed symbol, and $\Gamma_{k-1}$ represents a system noise input matrix; as this example is a nonlinear problem, and $\Phi_{k|k-1}$ and $\Gamma_{k-1}$ are Jacobian matrices of nonlinear function $f(\cdot)$ about $\hat{X}_{k-1}$ and $\hat{u}_{k-1}$, respectively, which are expressed as follows:

$$\Phi_{k|k-1} = \frac{\partial f}{\partial X_{K-1}} \bigg| X_{K-1} = \hat{X}_{k-1}$$

$$\Gamma_{k-1} = \frac{\partial f}{\partial u_{k-1}} \bigg| u_{k-1} = \hat{u}_{k-1};$$

calculating a filtering gain according to the next position information prediction error by using the extended Kalman filter equation, and the established equation is as follows:

$$K_k = P_{k|k-1}H_k^T\left(H_k P_{k|k-1}H_k^T + R_k\right)^{-1},$$

where $K_k$ represents the filtering gain; $P_{k|k-1}$ represents the next position information prediction error; $H_k$ represents an observation matrix at time k; and $R_k$ represents a system noise error;

calculating the position information predicted value at the current time by using the extended Kalman filter equation and according to the next position information predicted value, the filtering gain and the position information observed value at the current time (the position information predicted value at the current time is the position information predicted value). The equation is established as follows:

$$\hat{X}_k = \hat{X}_{k|k-1} + K_k\left(Z_k - \hat{Z}_{k|k-1}\right);$$

in the formula, $\hat{X}_k$ represents position information predicted value at the current time; $\hat{X}_{k|k-1}$ represents the next position information predicted value; $K_k$ represents the filtering gain, $Z_k$ represents a position observation predicted value at the current time; and $\hat{Z}_{k|k-1}$ represents the position information predicted value of the AUV at the last time;

calculating a position information prediction error at the current time by using the Kalman filter equation and according to a next position information prediction error; the equation is established as follows:

$$P_k = (I - K_k H_k)P_{k|k-1};$$

in the formula, $P_k$ represents the position information prediction error at the current time; I represents unit matrix; $H_k$ represents the observation matrix at time k; and $P_{k|k-1}$ represents the next position information prediction error.

Embodiment 2

Figure 5:
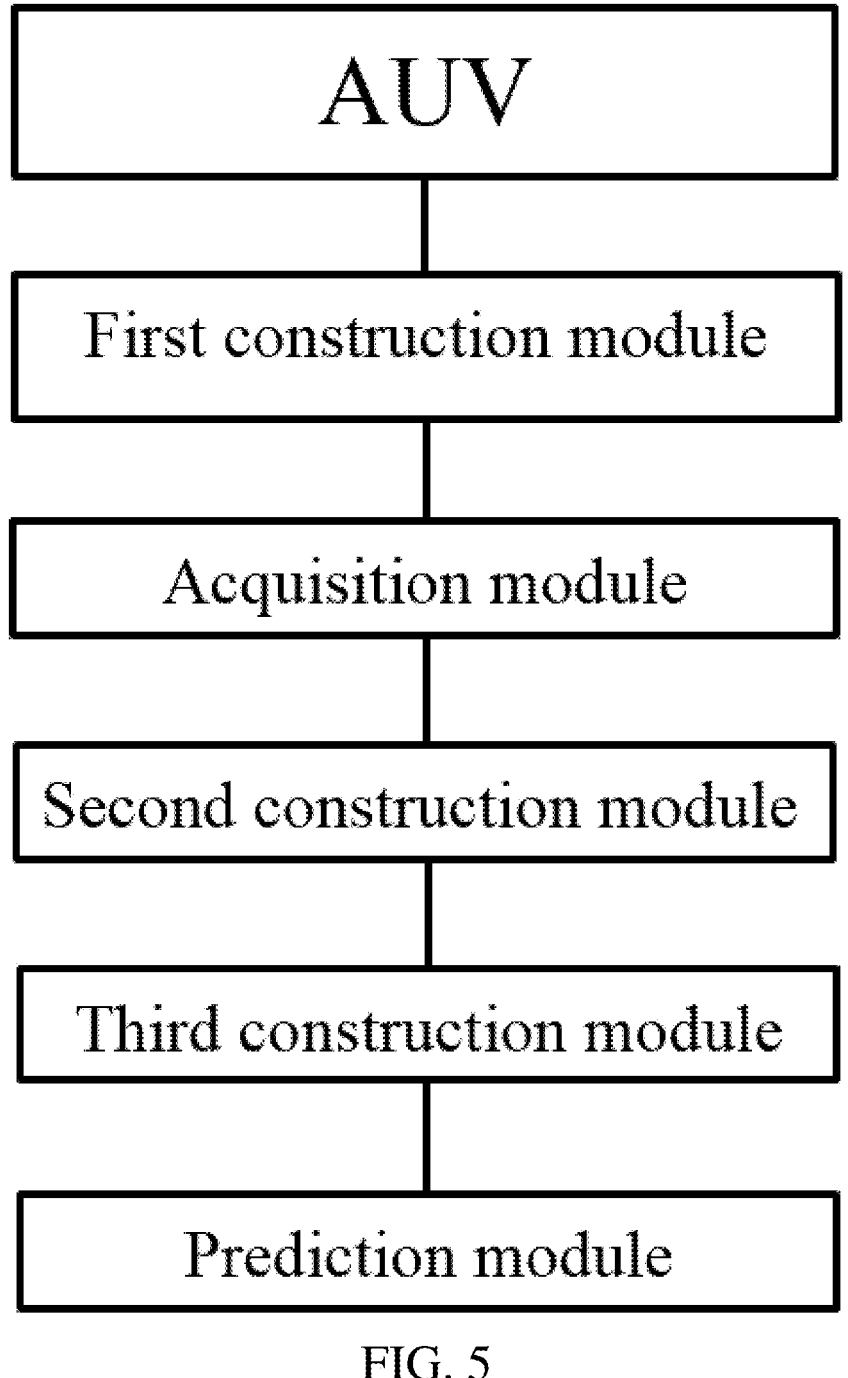
FIG. 5 is a structural schematic diagram of the system according to an embodiment of the present disclosure.

As shown in FIG. 5, FIG. 5 is a schematic diagram of the system structure according to an embodiment of the disclosure, the system includes an Autonomous Underwater Vehicle (the AUV) positioning system, also includes a first construction module, an acquisition module, a second construction module, a third construction module and a prediction module. The first construction module is used for establishing a state equation based on a system model of an the AUV positioning system; the acquisition module is used for acquiring an included angle between a direction vector of the AUV to an observation station and a velocity vector of the AUV based on the system model; the second construction module is used for establishing an observation equation according to the state equation and the included angle; the third construction module is used for establishing an extended Kalman filter equation based on the system model, the included angle and the observation equation; and the prediction module is used for calculating a position information predicted value at the current time by using the extended Kalman filter equation to complete communication delay compensation.

The following explains in detail how the disclosure solves the technical problems in real life in combination with this embodiment.

The first construction module is used for establishing a state equation based on a system model of the AUV positioning system.

based on the system model of the AUV, establishing the state equation:

$$X_k = f(X_{k-1}, u_{k-1}) + \Gamma_{k-1}W_k,$$

in the formula, $X_k$ represents an n-dimensional state vector at k point of time; $X_{k-1}$ represents an n-dimensional state vector at k−1 point of time; $u_{k-1}$ represents a system input; $\Gamma_{k-1}$ represents a system noise input matrix from k−1 point of time to k point of time; $W_k$ represents a system noise vector at k−1 point of time; and $f$ represents a nonlinear state function of a system state.

In this embodiment, considering that the communication delay in the underwater positioning system may negatively affect the positioning accuracy, if the distance between the AUV and the observation station is directly substituted into the observation equation as measurement data, a large error is introduced to affect the navigation performance. In this scenario, this embodiment introduces Doppler measurement data and uses an EKF filtering method based on the reconstructed measurement equation to compensate the navigation error caused by the delay. The communication delay of the positioning system is shown in FIG. 2.

The acquisition module is used for acquiring the included angle between a direction vector of the AUV to the observation station and the velocity vector of the AUV based on the system model (the motion schematic of the AUV is shown in FIG. 3), and the steps include:

as shown in FIG. 4, a Doppler measurement equation of the AUV is obtained based on a geometric diagram of the target positioning by the mobile sensor with Doppler measurement.

$$\begin{cases} \tilde{f}_k = f_k + e_k \\ f_k = f_s\left(1 + \dfrac{v_k^T(u - s_k)}{c|u - s_k|}\right) = f_s\left(1 + \dfrac{|v_k|}{c}\cos\beta_k\right), \end{cases}$$

where $f_s$ represents a frequency of an acoustic signal emitted by a target; $f_k$ represents a frequency of an acoustic signal theoretically received by the target; $\tilde{f}_k$ represents a frequency of an acoustic signal actually received by the target; $e_k$ represents frequency noise; c represents a propagation speed of a propagation signal in water; $v_k$ represents a driving speed of the AUV; u represents a position of the observation station; $s_k$ represents a position of the AUV at k point of time; $\beta_k$ represents the included angle between the direction vector of the AUV to the observation station and the velocity vector of the AUV; T represents a vector transposed symbol.

Then, based on the transceiver frequency, an included angle of the AUV is deduced from the Doppler measurement equation:

$$\beta_k = \arccos\left(\frac{c}{|v_k|}\left(\frac{f_k}{f_s} - 1\right)\right).$$

Finally, according to the included angle, the measurement equation of EKF is reconstructed, and an updated observation equation is:

$$Z'_k = d'^2_1 + d^2_{\delta t} - 2d'^2_1 d^2_{\delta t} \cos \beta_k,$$

where $$Z'_k$$

represents an Euclidean distance between the AUV and the observation station at time t2, d' represents a distance of the AUV from the observation station at a last point of time; $\delta_t$ represents a communication delay time; and $d_{\delta t}$ represents a distance traveled by the AUV within $\delta_t$ duration, and $\beta_k$ represents the included angle between the direction vector of the AUV to the observation station and the velocity vector of the AUV.

Thus, more accurate position information of the AUV at a signal receiving time t2 is obtained, and compensation for communication delay positioning error is realized.

The second construction module is used for establishing an observation equation according to the state equation and the included angle.

$$Z'_k = d'^2_1 + d^2_{\delta t} - 2d'^2_1 d^2_{\delta t} \cos \beta_k;$$

in the formula, d' represents a distance of the AUV from the observation station at a last point of time; $\delta_t$ represents a communication delay time; and $d_{\delta t}$ represents a distance traveled by the AUV within $\delta_t$ duration.

Using the observation equation, calculating the distance observation value at the current time;

$$z_k = h(\hat{X}_{k|}) + \psi^p_k,$$

where $z_k$ represents an observation vector at time k, $h(\hat{X}_{k|})$ represents a nonlinear function of a system observation vector, and $$\psi^p_k$$

represents an observation noise vector at time k.

The third construction module is used for establishing an extended Kalman filter equation based on the system model, the included angle and the observation equation. The observation equation is updated according to the Doppler measurement information.

The prediction module is used for calculating a position information predicted value at the current time by using the extended Kalman filter equation to complete communication delay compensation.

According to distance data between the AUV and the observation station, calculating position information of the AUV, acquiring a position information measured value of the AUV at the current time, and at the same time, acquiring a position information predicted value of the AUV at the last time and a position information prediction error of the AUV at the last time;

calculating a position information observed value of the AUV at the current time by using the observation equation and according to the position information measured value of the AUV at the current time; and calculating the position information predicted value of the AUV at the current time by using the extended Kalman filter equation and according to the position information observed value of the AUV at the current time, the position information predicted value of the AUV at the last time and the position information prediction error of the AUV at the last time, where the position information predicted value of the AUV at the current time is the position information predicted value.

calculating the position predicted value of the AUV at the current time by using the extended Kalman equation and according to the position information observed value of the AUV at the current time, the position information predicted value of the AUV at the last time and the position information prediction error of the AUV at the last time, where a complete extended Kalman filtering process is as follows:

a state prediction:

$$\hat{X}_{k|k-1} = f(\hat{X}_{k-1}, u_{k-1}),$$

where $\hat{X}_{k|k-1}$ represents the next position information predicted value; $\hat{X}_{k-1}$ is the position information predicted value of the AUV;

calculating a next position prediction by using the extended Kalman filter equation and according to the position information prediction error of the AUV at the last time. The established equation is:

$$P_{k|k-1} = \Phi_{k|k-1} P_{k-1} \Phi^T_{k|k-1} + \Gamma_{k-1} Q_{k-1} \Gamma^T_{k-1},$$

where $P_{k|k-1}$ represents the next position information prediction error; $P_{k-1}$ represents the position information prediction error of the AUV at the last time; $Q_{k-1}$ represents a position observation error at the last time;

$$\Phi^T_{k|k-1}$$

represents a state transition matrix, T represents a vector transposed symbol, and $\Gamma_{k-1}$ represents a system noise input matrix; as this example is a nonlinear problem, and $\Phi_{k|k-1}$ and $\Gamma_{k-1}$ are Jacobian matrices of nonlinear function $f(\cdot)$ about $\hat{X}_{k-1}$ and $\hat{u}_{k-1}$, respectively, which are expressed as follows:

$$\Phi_{k|k-1} = \frac{\partial f}{\partial X_{K-1}} \bigg|_{X_{K-1} = \hat{X}_{k-1}}$$

$$\Gamma_{k-1} = \frac{\partial f}{\partial u_{k-1}} \bigg|_{u_{k-1} = \hat{u}_{k-1}};$$

calculating a filtering gain according to the next position information prediction error by using the extended Kalman filter equation, and the established equation is as follows:

$$K_k = P_{k|k-1} H_k^T \left( H_k P_{k|k-1} H_k^T + R_k \right)^{-1},$$

where $K_k$ represents the filtering gain; $P_{k|k-1}$ represents the next position information prediction error; $H_k$ represents an observation matrix at time k; and $R_k$ represents a system noise error;

calculating the position information predicted value at the current time by using the extended Kalman filter equation and according to the next position information predicted value, the filtering gain and the position information observed value at the current time (the position information predicted value at the current time is the position information predicted value). The equation is established as follows:

$$\hat{X}_k = \hat{X}_{k|k-1} + K_k(Z_k - \hat{Z}_{k|k-1});$$

in the formula, $\hat{X}_k$ represents position information predicted value at the current time; $\hat{X}_{k|k-1}$ represents the next position information predicted value; $K_k$ represents the filtering gain, $Z_k$ represents a position observation predicted value at the current time; and $\hat{Z}_{k|k-1}$ represents the position information predicted value of the AUV at the last time;

calculating a position information prediction error at the current time by using the Extended Kalman filter equation and according to a next position information prediction error; the equation is established as follows:

$$P_k = (I - K_k H_k) P_{k|k-1};$$

in the formula, $P_k$ represents the position information prediction error at the current time; I represents unit matrix; $H_k$ represents the observation matrix at time k; and $P_{k|k-1}$ represents the next position information prediction error.

The above-mentioned embodiment is only a description of the preferred mode of this disclosure, not a limitation on the scope of this disclosure. Without departing from the design spirit of this disclosure, various modifications and improvements made by ordinary technicians in this field to the technical scheme of this disclosure shall fall within the protection scope determined by the claims of this disclosure.

What is claimed is:

1. A communication delay compensation method based on an autonomous robot, comprising following steps:

establishing a state equation based on a system model of an AUV positioning system;

acquiring an included angle between a direction vector of an AUV to an observation station and a velocity vector of the AUV based on the system model;

establishing an observation equation according to the state equation and the included angle;

establishing an extended Kalman filter equation based on the system model, the included angle and the observation equation; and calculating a position information predicted value at a current time by using the extended Kalman filter equation to complete communication delay compensation;

wherein a method for acquiring the included angle comprises following steps: establishing a Doppler measurement equation according to the system model, and acquiring the included angle through a backward deduction of the Doppler measurement equation;

$$\begin{cases} \tilde{f}_k = f_k + e_k \\ f_k = f_s\left(1 + \frac{v_k^T(u - s_k)}{c|u - s_k|}\right) = f_s\left(1 + \frac{|v_k|}{c}\cos\beta_k\right), \end{cases}$$

wherein $f_s$ represents a frequency of an acoustic signal emitted by a target; $f_k$ represents a frequency of an acoustic signal theoretically received by the target; $\tilde{f}_k$ represents a frequency of an acoustic signal actually received by the target; $e_k$ represents frequency noise; c represents a propagation speed of a propagation signal in water; $v_k$ represents a driving speed of the AUV; u represents a position of the observation station; $s_k$ represents a position of the AUV at k point of time; $\beta_k$ represents the included angle between the direction vector of the AUV to the observation station and the velocity vector of the AUV; T represents a vector transposed symbol.

2. The communication delay compensation method based on the autonomous robot according to claim 1, wherein the state equation comprises:

$$X_k = f(X_{k-1}, u_{k-1}) + \Gamma_{k-1} W_k;$$

in the formula, $X_k$ represents an n-dimensional state vector at k point of time; $X_{k-1}$ represents an n-dimensional state vector at k−1 point of time; $u_{k-1}$ represents a system input; $\Gamma_{k-1}$ represents a system noise input matrix from k−1 point of time to k point of time; $W_k$ represents a system noise vector at k−1 point of time; and $f$ represents a nonlinear state function of a system state.

3. The communication delay compensation method based on the autonomous robot according to claim 1, wherein the observation equation comprises:

$$Z_k' = d_1'^2 + d_{\delta t}^2 - 2d_1'^2 d_{\delta t}^2 \cos\beta_k,$$

wherein d' represents a distance of the AUV from the observation station at a last point of time; $\delta_t$ represents a communication delay time; and $d_{\delta t}$ represents a distance traveled by the AUV within $\delta_t$ duration.

4. The communication delay compensation method based on the autonomous robot according to claim 3, wherein a method for calculating the position information predicted value comprises:

according to distance information between the AUV and the observation station, calculating position information of the AUV, acquiring a position information measured value of the AUV at the current time, and at the same time, acquiring a position information predicted value of the AUV at the last time and a position information prediction error of the AUV at the last time;

calculating a position information observed value of the AUV at the current time by using the observation equation and according to the position information measured value of the AUV at the current time; and calculating the position information predicted value of the AUV at the current time by using the extended Kalman filter equation and according to the position information observed value of the AUV at the current time, the position information predicted value of the AUV at the last time and the position information prediction error of the AUV at the last time, wherein the position information predicted value of the AUV at the current time is the position information predicted value.

5. The communication delay compensation method based on the autonomous robot according to claim 4, wherein:

calculating a next position information predicted value by using the extended Kalman filter equation according to the position information predicted value of the AUV at the last time comprises:

$$\hat{X}_{k|k-1} = f(\hat{X}_{k-1}, u_{k-1}),$$

wherein $\hat{X}_{k|k-1}$ represents the next position information predicted value; $\hat{X}_{k-1}$ is the position information predicted value of the AUV;

calculating a next position information prediction error by using the extended Kalman filter equation and according to the position information prediction error of the AUV at the last time comprises:

$$P_{k|k-1} = \Phi_{k|k-1} P_{k-1} \Phi_{k|k-1}^{T} + \Gamma_{k-1} Q_{k-1} \Gamma_{k-1}^{T},$$

wherein $P_{k|k-1}$ represents the next position information prediction error; $P_{k-1}$ represents the position information prediction error of the AUV at the last time; $Q_{k-1}$ represents a position observation error at the last time;

$$\Phi_{k|k-1}^{T}$$

represents a state transition matrix, T represents a vector transposed symbol, and $\Gamma_{k-1}$ represents a system noise input matrix;

calculating a filtering gain according to the next position information prediction error by using the extended Kalman filter equation comprises:

$$K_k = P_{k|k-1} H_k^T (H_k P_{k|k-1} H_k^T + R_k)^{-1},$$

wherein $K_k$ represents the filtering gain; $P_{k|k-1}$ represents the next position information prediction error; $H_k$ represents an observation matrix at time k; and $R_k$ represents a system noise error;

calculating the position information predicted value at the current time by using the extended Kalman filter equation and according to the next position information predicted value, the filtering gain and the position information observed value at the current time comprises:

$$\hat{X}_k = \hat{X}_{k|k-1} + K_k(Z_k - \hat{Z}_{k|k-1}),$$

wherein $\hat{X}_k$ represents position information predicted value at the current time; $\hat{X}_{k|k-1}$ represents the next position information predicted value; $K_k$ represents the filtering gain, $Z_k$ represents a position observation predicted value at the current time; and $\hat{Z}_{k|k-1}$ represents the position information predicted value of the AUV at the last time; and calculating the position information prediction error at the current time by using the extended Kalman filter equation and according to the next position information prediction error, wherein comprises:

$$P_k = (I - K_k H_k) P_{k|k-1},$$

wherein $P_k$ represents the position information prediction error at the current time; I represents unit matrix; $H_k$ represents the observation matrix at time k; and $P_{k|k-1}$ represents the next position information prediction error.

\* \* \* \* \*